(12) United States Patent
Yalawarmath et al.

(10) Patent No.: US 12,217,369 B2
(45) Date of Patent: Feb. 4, 2025

(54) ADAPTABLE PRESENTATION FORMAT FOR VIRTUAL REALITY CONSTRUCTS

(71) Applicant: Mitel Networks Corporation, Kanata (CA)

(72) Inventors: Anilkumar Yalawarmath, Attiguppe Bengaluru (IN); Logendra Naidoo, Ottawa (CA); Boopalan Rajendran, Bangalore (IN)

(73) Assignee: Mitel Networks Corporation, Kanata (CA)

(*) Notice: Subject to any disclaimer, the term of this patent is extended or adjusted under 35 U.S.C. 154(b) by 0 days.

(21) Appl. No.: 17/571,148

(22) Filed: Jan. 7, 2022

(65) Prior Publication Data
US 2023/0222737 A1   Jul. 13, 2023

(51) Int. Cl.
*G06T 19/00*       (2011.01)

(52) U.S. Cl.
CPC .................................. *G06T 19/006* (2013.01)

(58) Field of Classification Search
CPC ...... G06F 40/14; G06F 40/143; G06F 40/137; H04L 41/22; H04N 1/00429; G06T 19/006; G06Q 10/10
See application file for complete search history.

(56) References Cited

U.S. PATENT DOCUMENTS

| | | | |
|---|---|---|---|
| 10,636,212 B2 * | 4/2020 | Tamaoki | G06F 3/0482 |
| 2016/0330508 A1 * | 11/2016 | Newell | H04N 21/233 |
| 2018/0136814 A1 | 5/2018 | Parekkadan et al. | |
| 2018/0137681 A1 * | 5/2018 | Chang | G06F 3/0485 |
| 2018/0232340 A1 * | 8/2018 | Lee | G06F 40/186 |
| 2021/0004405 A1 * | 1/2021 | Solomon | H04R 3/12 |
| 2021/0011899 A1 * | 1/2021 | Olivier | G06F 40/134 |
| 2021/0049822 A1 * | 2/2021 | Meriaz | G06F 3/0482 |
| 2021/0248304 A1 * | 8/2021 | Olivier | G06F 40/106 |
| 2022/0222878 A1 * | 7/2022 | Raman | G06F 40/284 |

FOREIGN PATENT DOCUMENTS

WO    WO-2019199569 A1 * 10/2019  .............. G06F 3/011

OTHER PUBLICATIONS

Hensen Benedikt et al: "ImPres: An Immersive 3D Presentation Framework . . . ", Nov. 3, 2021, pp. 28-39, XP047615544.

\* cited by examiner

*Primary Examiner* — Chante E Harrison (57) ABSTRACT

A method and system creates a spatial, multi-dimensional presentation file (i.e., a VR file) from a two-dimensional (2D) presentation file. The system may include a server to receive the 2D file and identify axis points in the 2D file. The one or more axis points and supplemental information related to one or more of the axis points are provided to a VR conversion engine. The VR conversion engine creates a VR file that includes the 2D file and supplemental information relating to the one or more axis points.

19 Claims, 7 Drawing Sheets

ADAPTABLE PRESENTATION FORMAT FOR VIRTUAL REALITY CONSTRUCTS

FIELD

The present disclosure relates to systems and methods for creating a presentation with virtual reality (VR) aspects from a two-dimensional (2D) presentation.

BACKGROUND

Virtual reality (VR) is known, for example, to be used in certain electronic games. However, virtual reality is not used for conferencing (or presentation) applications. Applying VR to conference software requires the addition of VR content, which could be difficult and time consuming.

Many conference visuals are prepared using a software such as PowerPoint, which can be boring for presentation participants because the format is familiar and is not particularly stimulating, even if different graphics, fonts, and colors are used. Presently, there is no simple way to create a VR presentation from a traditional 2D presentation.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

The description of exemplary embodiments provided below is merely exemplary and is intended for purposes of illustration only; the following description is not intended to limit the scope of the claims. Moreover, recitation of multiple embodiments having stated features is not intended to exclude other embodiments having additional or fewer features or other embodiments incorporating different combinations of the stated features.

Disclosed are methods and systems to convert a presentation file in a 2D format (e.g., PowerPoint) into a three-dimensional (3D) VR presentation file (also referred to herein as a spatial, multi-dimensional file). A VR presentation permits conference participants to, if they desire, delve virtually further into a presentation topic while watching the VR presentation. One benefit of a VR presentation as compared to a 2D presentation is that additional content in a VR presentation may be more memorable and interesting to conference participants, as compared to the conference participants watching a 2D presentation and later reading more or asking questions about a presentation topic. The methods and systems according to this disclosure and claims can operate in a premise, cloud-based, or hybrid environment.

As used herein, "engine" refers to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). In accordance with examples of the disclosure, a non-transient computer readable medium containing program can perform functions of one or more methods, modules, engines and/or other system components as described herein.

As used herein, "database" refers to any suitable database for storing information, electronic files or code to be utilized to practice embodiments of this disclosure. As used herein, "server" refers to any suitable server, computer or computing device for performing functions utilized to practice embodiments of this disclosure.

Figure 1:
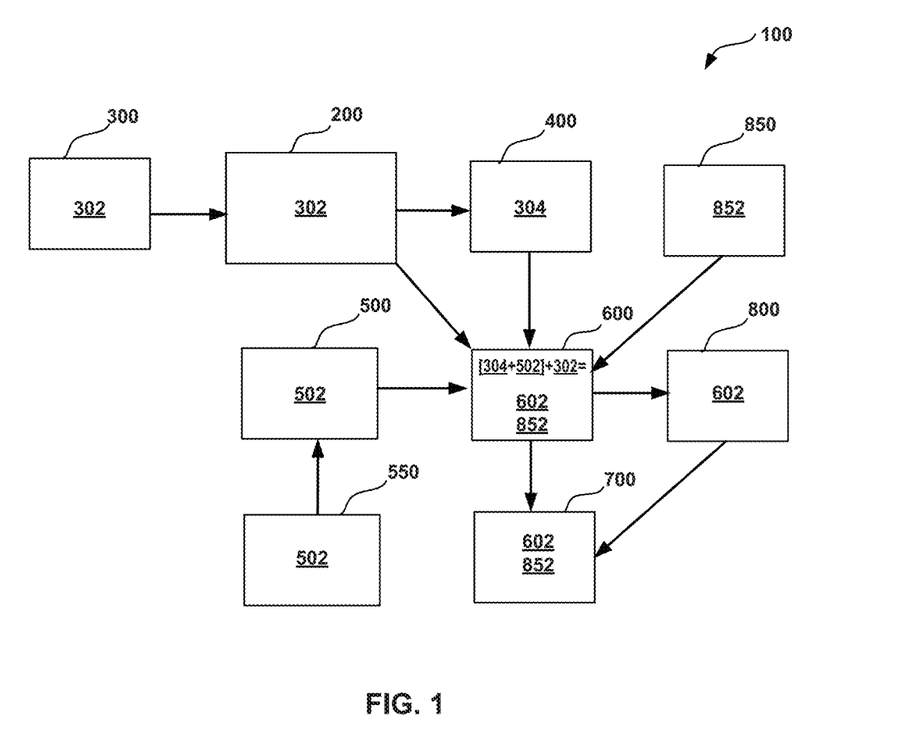
FIG. 1 illustrates a system for converting a 2D presentation to a VR presentation in accordance with exemplary embodiments of this disclosure.

Turning now to the Figures, wherein the purpose is to describe embodiments of this disclosure and not to limit the scope of the claims, FIG. 1 shows an exemplary system (100). System (100) is configured to create a spatial, multi-dimensional file (602) from a file (302) in a two-dimensional format.

System (100) includes a server (200) configured to receive a file (302) in a two-dimensional (2D) format from a computer or other server (300) and to identify a plurality of axis points (304) in the 2D file (302). Alternatively, 2D file (302) may be created in server (200), or uploaded or otherwise sent to server (200) from a source other than computer or server (300), and a command can be sent to server (200) to identify one or more axis points (304) in 2D file (302).

An axis point (304) in 2D file (302) can identify content of the presentation in the 2D file (302), such as content that represents a high level of a topic of the presentation. For example, an axis point (304) may identify an "Overview," "Background," and/or "Agenda" of a presentation topic.

Additionally, one or more axis points (304) may identify points or sections of topics (points and sections of topics are sometimes collectively referred to herein as "subtopics"). For example, points or sections of topics in 2D file (302) may be indicated by bullets, em Dash, en Dash, letters, numbers, new paragraphs, headings, and/or new pages. Thus, any topic and/or subtopic in 2D file (302) may be identified by an axis point (304). A user can operate server (200) to assign axis points (304) to any or all topics and/or subtopics in 2D file (302). Axis points (304) may also be used to identify one or more pictures, tables, interactive media such as video, or renditions of three-dimensional objects in 2D file (302).

An axis points database (400) is in communication with server (200) and stores axis points (304) that are identified by server (200). Alternatively, server (200) may communicate axis points (304) directly to VR conversion engine (600), in which case axis points database (400) may not be used.

Supplemental information (502) related to at least one axis point (304) is obtained from a source (550) and stored in supplemental information database (500). The supplemental information (502) can be provided from any suitable source (550), such as from the Internet or provided by the author of the presentation. The supplemental information database (500) is in communication with VR conversion engine (600) and is configured to provide supplemental information (502) to VR conversion engine 600. Alternatively, supplemental information (502) may be provided to VR conversion engine (600) from source (550), in which case supplemental information database (500) may not be used.

VR conversion engine (600) is programmed with 3D wireframe model software, which provides a skeletal, VR format onto which axis points (304), supplemental information (502), and 2D file (302) can be added. The 2D file (302) is added to the wireframe model software so that when a spatial, multi-dimensional file (602) is presented the 2D file (302) is visible to conference participants when looking straight ahead and not moving or gesturing, as explained below, to view supplemental information (502). Supplemental information (502) is added to the wireframe model software such that it is associated with a related axis point (304) and visible to a conference participant when looking to the side, looking up or down, and/or gesturing, as explained below.

A database (850) of VR landscapes (852) may be in communication with VR conversion engine (600). Database (850) could include any number of VR landscapes (852), such as a beach, ocean, underwater, surface of the moon, space, desert, etc. The wireframe model software is configured to overlay spatial, multi-dimensional file (or VR file) (602) on any landscape (852) in database (850). Alternatively, a landscape (852) need not be used and VR file (602) may be presented on a colored background, such as white, blue, red, or multi-colored. In that case, database (850) may not be used. Further, a landscape (852) or other background could be provided from any suitable source other than database (850).

As shown in FIG. 1, the VR conversion engine (600) is in communication with the axis points (304) in database (400), the supplemental information database (500), server (200), and database (850). VR conversion engine (600) receives one or more axis points (304), supplemental information (502) related to at least one of axis points (304), 2D file (302), and optionally a landscape (852) from database (850). As shown, 2D file (302) is received by VR conversion engine (600) from server (200), although 2D file (302) may be received from any suitable source, such as from computer/server (300).

VR conversion engine (600) creates a spatial, multi-dimensional file (602) by matching at least one axis point (304) to related supplemental information (502), i.e., [304+502]. Appropriate supplemental information (502) may be added to any number of axis points (304). 2D file (302) is also added to spatial, multi-dimensional file (602). Thus, the combined one or more axis points (304) plus supplemental information (502) related to each of the one or more axis points (304), plus 2D file (302) create a spatial, multi-dimensional file (602). Optionally, a landscape (852) is included as part of VR file (602).

Again referring to FIG. 1, spatial, multi-dimensional file (602) can be stored in database (800). Spatial, multi-dimensional file (602) can be sent to an electronic display (700) from either VR conversion engine (600) or database (800). Electronic display (700) is configured to display the spatial, multi-dimensional file (602) such that conference participants can view it in either a 2D format, a 3D format, or both (e.g., 2D during part(s) of the presentation and 3D during other part(s)), depending upon a participant's preference. This is explained further below and illustrated in FIGS. 4-6.

Figure 2:
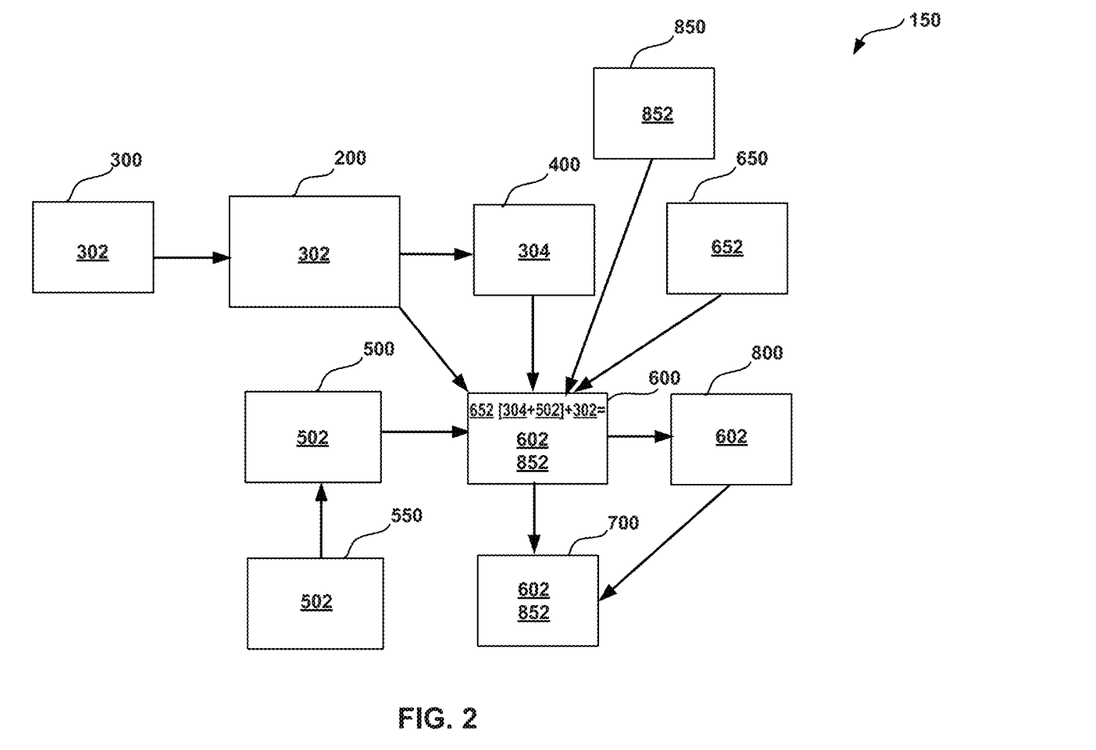
FIG. 2 illustrates an alternate system for converting a 2D presentation to a VR presentation in accordance with exemplary embodiments of this disclosure.

FIG. 2 shows an alternate, exemplary system 150 configured to create a spatial, multi-dimensional file (602) from a 2D file (302). System 150 includes the same components and functions in the same manner as system 100 except that it further includes a rule set database (650) that includes one or more rules (652) to apply when adding supplemental information (502) to at least one axis point (304).

A rule set (652) may be specific to each axis point (304) and include a format (or structure) and/or a hierarchy for how supplemental information (502) is organized and later presented in the spatial, multi-dimensional file (602) for an axis point (304). A rule set (652) may be created by a user, who enters a ruleset (652) for each desired axis point (304). Rule set (652) may be the same or different for each axis point (304). Rule set database may include a user interface that queries a user for different nodes or branches of content to be applied to an axis point (304). Each branch of content would be visible to a conference participant viewing the VR file (602) in a VR format. Each branch could be shown in 3D in a pathway format, wherein different supplemental information (502) would appear to be farther down a path than other of the supplemental information (502).

Figure 3:
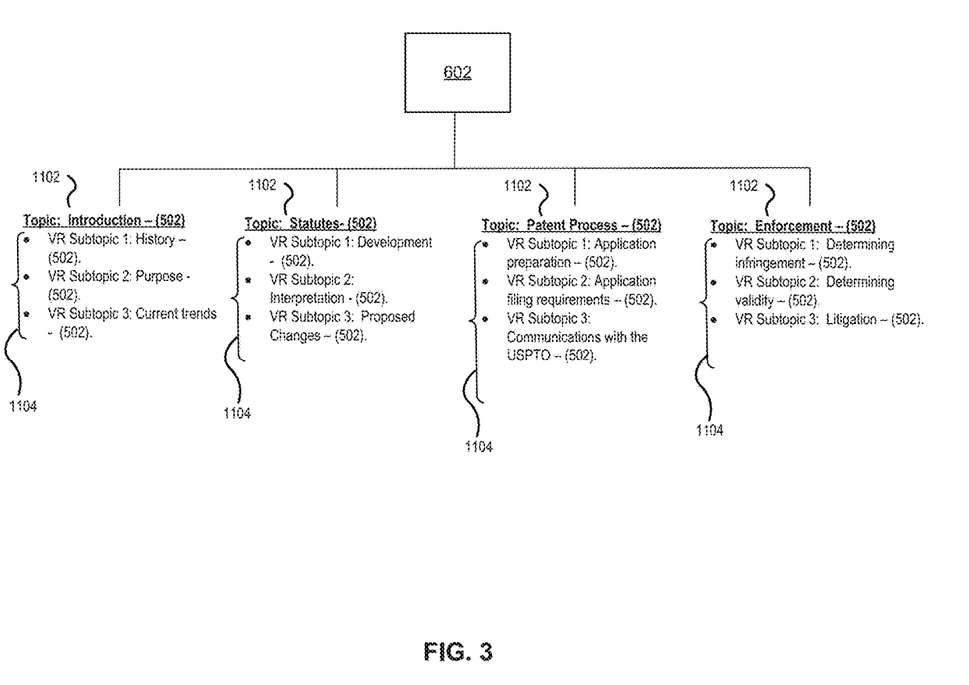
FIG. 3 illustrates topics and subtopics that may be included in a spatial, multi-dimensional file in accordance with exemplary embodiments of this disclosure.

Referring to FIG. 3, if a 2D presentation file (302) relates to United States patents, the axis points (304) may identify topics (1102) such as "Introduction," "Statutes," "Patent Process," and "Enforcement," to one or more of which supplemental information (502) could be provided. Each of these topics (1102) may include subtopics (1104) as shown in FIG. 3, to one or more of which supplemental information (502) could be provided. Utilizing system (100) supplemental information (502) may be not be organized in any particular manner. Utilizing system 150, rule set (652) would determine the format and order in which supplemental information (502) is (1) added to an axis point (304) to which a rule set (652) applies, and (2) viewed when VR file (602) is presented in a VR format. In this manner, when a participant is viewing a presentation of a spatial, multi-dimensional file (602) he/she can view related supplemental information (502) organized in a manner decided upon by the presenter based on a rule set (652). For example, the related supplemental information (502) could potentially be presented in a hierarchical (such as most relevant to least relevant) format.

Figure 4:
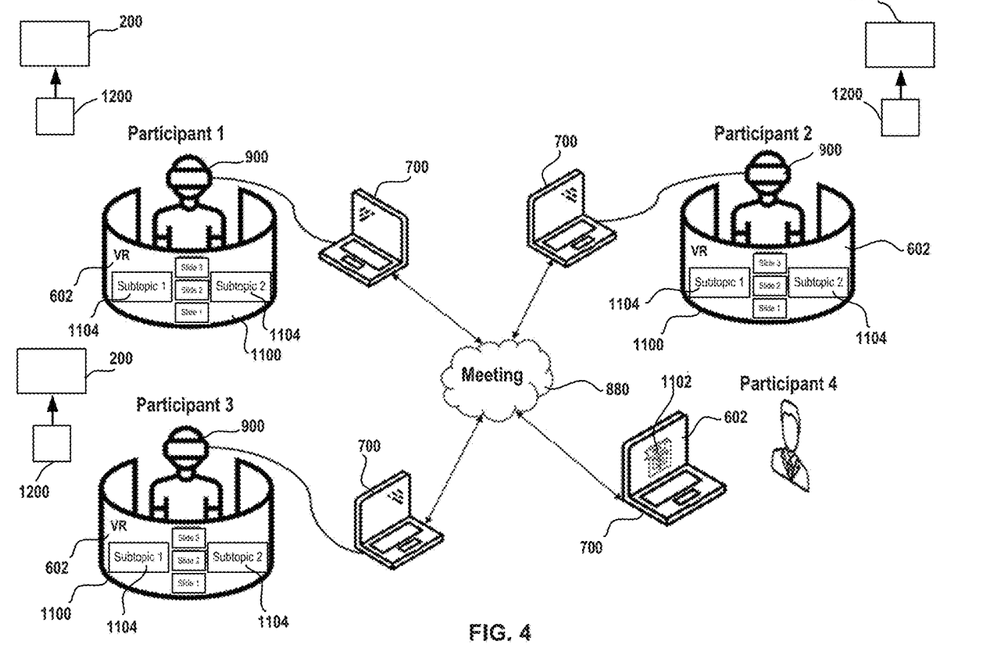
FIG. 4 illustrates a system for displaying a VR presentation in accordance with exemplary embodiments of this disclosure.

FIG. 4 illustrates a presentation of a VR file (602). VR file (602) is sent to electronic device (700), which can be a computer, cell phone, tablet, or any suitable electronic device for displaying VR file (602). As shown in the example of FIG. 4, each participant has his/her own personal electronic device (700), which in this case is a personal computer. Alternatively, VR file (602) may be displayed on a single electronic device (700) and multiple participants may view the presentation on the single electronic device 700.

In FIG. 4, Participant 1, Participant 2, and Participant 3 are each wearing VR glasses or augmented reality (AR) glasses (VR glasses and AR glasses are collectively referenced by numeral (900)) in order to view the presentation of VR file (602) in a VR format. In this format the participants can, if desired, view supplemental information (502). Participant 4 is viewing the presentation of VR file (602) in a 2D format and cannot view supplemental information (502). Participant 4 sees only 2D file (302).

Thus, each participant has the option to experience the VR presentation in (1) a standard 2D format, such as PowerPoint UX, or (2) in a VR format, such as by (a) using a wearable apparatus such as VR glasses or AR glasses (900), or (b) viewing on a VR display, such as a computer display having a VR viewer or AR viewer.

The VR aspects of the presentation of VR file (602) may be displayed in any suitable manner, such as in a billboard or signpost, or a floating virtual display.

As further shown in FIG. 4, a system according this disclosure may include one or more cameras (1200), wherein each camera is configured to view a participant. If utilized, each camera (1200) is in communication with, and is part of, system (100) or system (150), and as shown each camera (1200) communicates with server (200) although it may communicate with other devices in system (100) or system (150). Camera (1200) detects movement by the participant to which it is associated. The movement is communicated to system (100) or system (150), wherein the system modifies the information visible to the participant based upon the movement.

Figure 5:
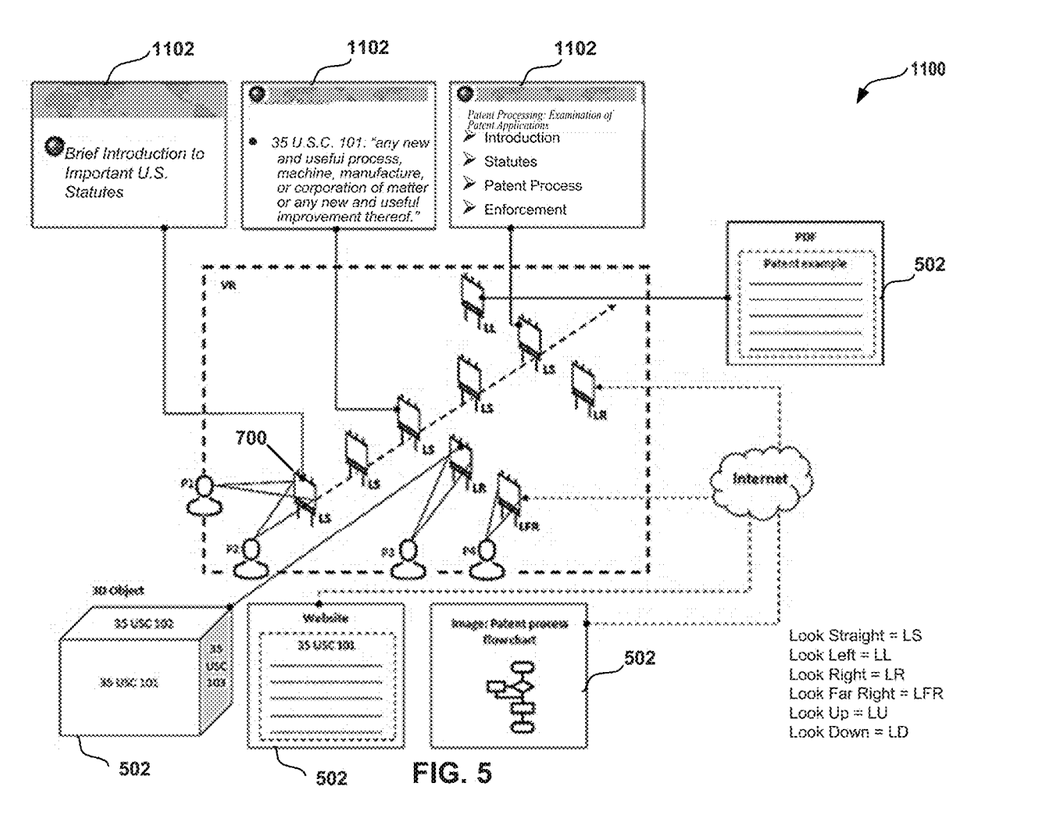
FIG. 5 illustrates (in 2D) an exemplary VR presentation according to aspects of this disclosure.

Turning to FIG. 5, participants P1-P4 are each viewing an electronic display 700. If the participant looks straight ahead, as are Participant P1 and Participant P2, he/she sees a presentation of 2D file (302). Participants P1 and P2, in this example, when looking straight ahead, may see topic (1102) of "Brief Introduction to Important U.S. Statutes" or topic (1102) of "Patent Processing—Examination of Patent Applications," or subtopic (1104) of 35 U.S.C. Section 101.

If the participant looks right, as is participant P3, he/she sees supplemental information (502) related to an axis point (304). In this example the supplemental information (502) is a 3D object that includes different patent statutes on different surfaces of the object. Alternatively, supplemental information (502) that is visible when a participant looks right could be, or include, supplemental information (502) of a patent process flow chart.

If the participant looks far right, as is participant P4, certain additional supplemental information (502) related to an axis point (304) may be visible. In this example, participant P4 is looking far right and views a website with information about a patent statute, such as 35 U.S.C. Section 101.

If the participant looks left, which none of participants P1-P4 are, certain supplemental information (502) related to an axis point (304) may be seen. In this example, if a participant looks left, he/she would see supplemental information (502), which in this case is a PDF example of a patent.

Figure 6:
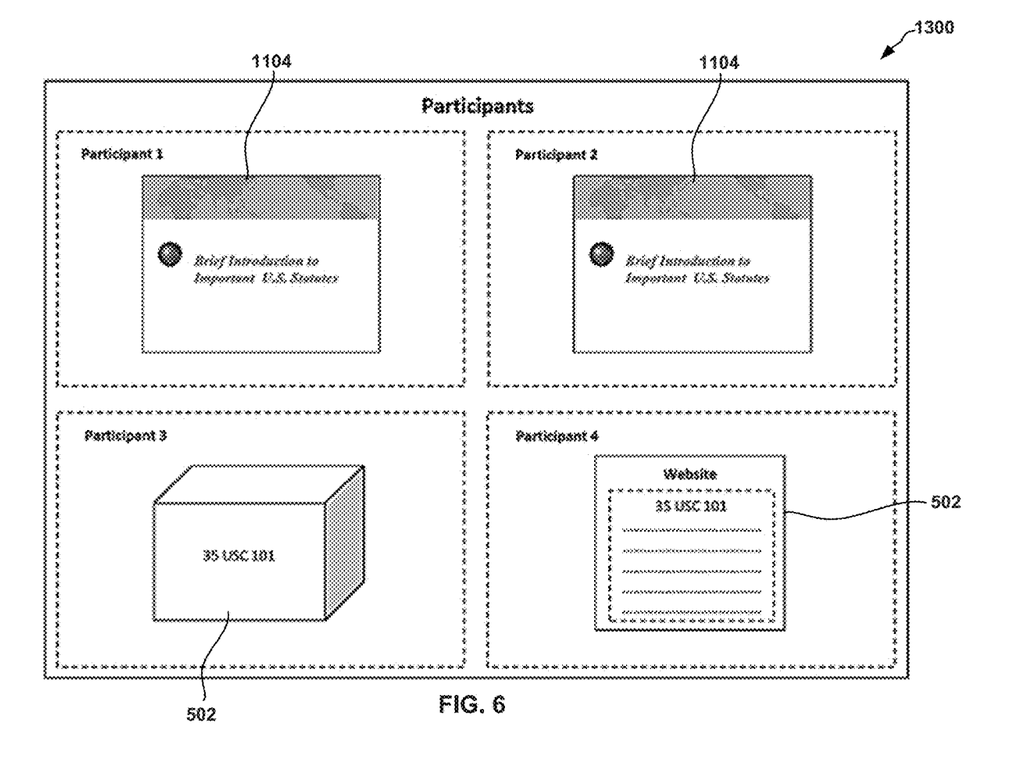
FIG. 6 shows exemplary views that the participants of FIG. 5 may see.

FIG. 6 is an illustration of an image 1300 that may be available to one or more participants, and/or to the presentation leader. Image 1300 shows what each of participants P1-P4 in FIG. 5 are viewing, so subjects of most interest to one or more participants, lack of attention by one or more participants, distraction of one or more participants, and/or general presentation interest may be ascertained.

Although not shown here, VR file (602) may be structured such that if a participant looks up, more additional supplemental information (502) related to an axis point (304) may be visible. Further, VR file (602) may be structured such that if a participant looks down, more different supplemental information (502) related to an axis point (304) may be visible.

Instead of a camera (1200) detecting head movement, it could detect hand movement. In that case, and using the example of FIG. 5, a sliding or swiping hand-gesture to the left, right, far left, far right, up, or down, would make visible the same supplemental information (502) as a head movement to the left, right, far left, far right, up, or down. Thus, a participant's gestures may define the type of supplemental information presented and a VR presentation according to this disclosure could enable each participant to control the VR content he/she reviews.

VR file (602) may be configured such that supplemental information is visible upon any type of movement, such as diagonal, backwards and/or forwards, or to the left, right, far left, and far right. Or, VR file (602) may be configured such that supplemental information is visible only upon movement in one or more selected directions, such as only to the left, only to the right, only upwards, or only downwards, or as shown in FIG. 5, to each of the right, the far right, the left, and the far left.

In the presentation of a VR file (602), each dimension and/or direction could make certain types or categories of supplemental information (502) become visible. For example, moving a hand or head to one side could display multiple topics/subtopics of the same category as the topic (1102) or subtopic (1104) being viewed, such as "Movies: Adventure, Drama, Comedy, Mystery, etc."

Further, moving a hand or head up and/or down may display deeper content regarding, or more information about, an axis point (304).

As another example, if a participant looks down or waves downward the participant could see supplemental information (502) related to a topic (1102). The topic (1102) could be "Adventure Movies" and the supplemental information (502) could be adventure movies titles, e,g., "Indiana Jones," "Thugs of Hindustan," etc. The same VR file (602) may be created and structured so if a participant looks up or waves upwards, the participant could see supplemental information (502) such as "What are adventure movies?," "Typical adventure movies," "Famous Adventure Movies," "Bollywood vs. Hollywood," etc.

As yet another example, if the participant is viewing the topic (1102) "Future Cloud Computing Trends," he/she could swipe left and view the supplemental information (502) of "Cloud Infrastructure," "Cloud Platforms," "Cloud Security," "Cloud Software," "Coronavirus Application and Platform Security," "Cybersecurity," "A.I.," and/or "Machine Learning."

Clipboard functions could potentially be utilized during the presentation of a VR file (602). In that case a participant could select content (which includes topics (1102), subtopics (1104), and/or supplemental information (502) related to an axis point (304)) from VR file (602) and system (100, 150) would be configured to permit copying (e.g., have a copy function available to one or more participants) of the presentation. A participant could store the copied content into a notetaking application, or copy and paste the content into an email, document, computer desktop, or any suitable location where the content, such as supplemental information (502), can be saved. Any cell phone, tablet, or computer would be suitable for the participant to store content the participant desires to preserve for future reference.

The clipboard (or copy) function could be enabled in any suitable manner such as be sending a command from a user device to (1) server 200 to copy all or part of 2d file (302), or (2) VR conversion engine (600) to copy all or part of VR file (602), which may include all or part of 2D file (302) and/or all or part of supplemental information (502).

A system and method according to this disclosure may also have an editing or modification function, which would permit participants to edit VR file (602) and potentially to 2D file (302) while in edit mode. This could support collaboration by participants (1) directed to the presentation content, and (2) directed to the modifications. Such edits could lead to updating 2D file (302) itself, or only to editing supplemental information (502) and/or the arrangement or presentation of supplemental information (502).

The edit function could be enabled in any suitable manner such as be sending a command from a user device to (1) server 200 to edit 2d file (302), (2) VR conversion engine (600) to edit VR file (602), which may in turn send a command to server (200) to edit 2d file (302), to database (500) to edit supplemental information (502) associated with one or more axis points (304), to rule set database (850) to modify one or more rule sets (852), and/or to axis points database (400) to edit, add or delete one or more axis points (304), (3) to database (500) to edit supplemental information (502) associated with one or more axis points (304), (4) to rule set database (850) to modify one or more rule sets (852), and/or (5) to axis points database (400) to edit, add or delete one or more axis points (304).

The ability to access system (100) or system (150) to make edits may be available to all presentation participants and the presenter, or to a sunset of the participants, or to only the presenter. Using collaboration and editing while watching the presentation can make the presentation more enjoyable, better keep participants' attention, and lead to an improved presentation.

The clipboard and editing functions described above may be utilized in any suitable manner, such as with a manual keyboard, touch screen keyboard, or a virtual keyboard.

Figure 7:
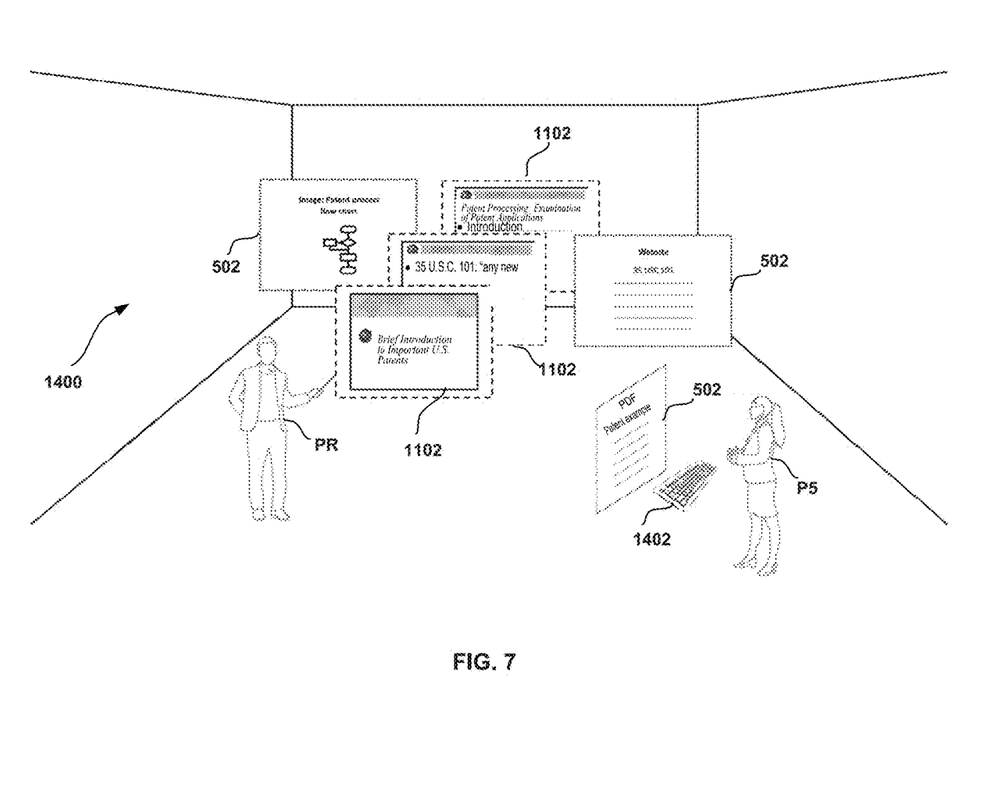
FIG. 7 illustrates an exemplary VR presentation according to aspects of this disclosure.

Referring to FIG. 7, a system (1400) is shown, which includes a virtual keyboard (1402), an electronic display (700) for showing a VR display (602), a participant P5, and a presenter PR. In FIG. 7, three slides with topics (1102)—Brief Introduction to Important U.S. Patent Statutes), 35 U.S.C. 101, and Patent Processing: Examination of Patent Applications—have been presented by presenter PR. In this illustration, by looking left a participant can see supplemental information (502) (Image Patent process flow chart), and by looking right a participant can see supplemental information (502), which is a website showing information related to 35 U.S.C. 101. Participant P5 is reviewing supplemental information (502), which as shown is a PDF patent example, which she could be viewing by looking (or moving her hand) left, far left, right, or far right, or in another direction, as previously described, depending upon the structure of VR file (602).

Using virtual keyboard (1402) participant P5 could utilize the clipboard function, or the editing or modification function. A virtual, or projection keyboard is a computer input device whereby a virtual keyboard image is projected by any suitable device onto a surface. When a user touches the surface or space covered by an image of a key, the device, which could be an electronic display (700) that is the participant's personal computer, records the corresponding keystroke. The device that projects the virtual keyboard image may connect to a Bluetooth device or include Bluetooth functionality.

The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. A computer system for creating a spatial, multi-dimensional (VR) file from a file in a two-dimensional format, the system comprising:

a server configured to receive a file in a two-dimensional format and to identify a plurality of axis points in the file;

an axis points database in communication with the server, the axis points database configured to store axis points identified by the server;

a supplemental information database that includes supplemental information relating to one or more of the axis points, wherein the supplemental information is provided by an author of the file in the two-dimensional format;

a rule set database that includes rule sets created by a user to apply when adding supplemental information to an axis point, wherein the rule set database includes a user interface that queries the user for different branches to be applied to an axis point and to be visible to a conference participant when viewing the VR file in a VR format; and a virtual reality (VR) conversion engine in communication with the axis points database, the supplemental information database, and the rule set database, wherein the VR conversion engine is configured to create a spatial, multi-dimensional file by matching at least some of the axis points from the axis points database to the supplemental information from the supplemental information database;

wherein the VR conversion engine further comprises a rendering component that accesses the rule set database to obtain one or more rule sets, wherein each of the one or more rule sets comprises one or more rules, and wherein each of the one or more rule sets is specific to one of the plurality of axis points and includes a format and hierarchy for how supplemental information is organized and presented in the VR file for the one of the plurality of axis points; wherein the supplemental information is presented as branches of content and each of the branches of content is shown in three dimensions (3D) in a pathway format, wherein different supplemental information appears to be farther down a path than other of the supplemental information.

2. The system of claim 1 that further includes an electronic display configured to display the spatial, multi-dimensional format file.

3. The system of claim 2 that further includes a visual aid for a user that assists the user in viewing the spatial, multi-dimensional file when it is displayed.

4. The system of claim 3, wherein the visual aid is one of: goggles, glasses, a VR headset, an augmented reality (AR) headset, or a screen configured to be positioned on a display of a user device.

5. The system of claim 2 that is configured to communicate with a user device and provide an electronic communication to the user device that permits the user to view the electronic display in either a two-dimensional format or in a spatial, multi-dimensional format.

6. The system of claim 1 that further includes a spatial, multi-dimensional file database in communication with the VR conversion engine, wherein the spatial, multi-dimensional file database is configured to store one or more spatial, multi-dimensional files created by the VR conversion engine.

7. The system of claim 1, wherein the axis points represent one or more of: versions of the file in a two-dimensional format; versions of the spatial, multi-dimensional file; a background; an agenda; speakers; pictures, images, pages; and topics.

8. The system of claim 1, wherein the supplemental information is obtained from the Internet or from an author of the file in a two-dimensional format.

9. A computer-implemented method operable on a computer system, wherein the computer system comprises a server, a virtual reality (VR) conversion engine, an axis points database in communication with the VR conversion engine, a rule set database, and a supplemental information database in communication with the VR conversion engine, the method comprising the steps of:
the server receiving a file in a two-dimensional format and determining axis points in the file;
storing the axis points in the axis points database;
storing rule sets created by a user in the rule set database, wherein a different rule set is configured to apply to each axis point, wherein the rule set database includes a user interface that queries the user for different branches to be applied to an axis point and to be visible to a conference participant when viewing a VR file in a VR format;
storing supplemental information related to one or more of the axis points in the supplemental information database, wherein the supplemental information is provided by an author of the file in the two-dimensional format; and
the VR conversion engine creating the VR file by matching the axis points from the axis points database to the supplemental information from the supplemental information database, and wherein the VR conversion engine further comprises a rendering component that accesses the rule set database to obtain one or more rule sets, wherein each of the one or more rule sets comprises one or more rules, and wherein each of the one or more rule sets is specific to one of the plurality of axis points and includes a format and hierarchy for how supplemental information is organized and presented in the VR file for the one of the plurality of axis points; wherein the supplemental information is presented as branches of content and each of the branches of content is shown in three dimensions (3D) in a pathway format, wherein different supplemental information appears to be farther down a path than other of the supplemental information.

10. The method of claim 9 that further includes the step of displaying the spatial, multi-dimensional format file.

11. The method of claim 10, wherein the computer system further includes a camera configured to map the movement of a user watching the displaying of the spatial, multi-dimensional format file, and that further includes the step of the server mapping movement of the user and altering the information displayed in the spatial, multi-dimensional format file based on the user's movement.

12. The method of claim 11, wherein a user can (a) look or swipe up, and (b) look or swipe down, in order to view more information regarding a displayed topic.

13. The method of claim 11, wherein the user can (a) look or swipe right, and (b) look or swipe left, in order to view topics related to a displayed topic.

14. A computer system for creating a hierarchical, spatial, multi-dimensional (VR) file from a file in a two-dimensional format, the system comprising:
a server configured to receive a file in a two-dimensional format and to identify a plurality of axis points in the file;
an axis points database in communication with the server, the axis points database configured to store axis points identified by the server;
a supplemental information database that includes supplemental information relating to one or more of the axis points, wherein the supplemental information is provided by an author of the file in the two-dimensional format;
a rule set database comprising a rule set created by a user for each of the axis points, wherein each rule set is specific to each of the axis points and includes a format and hierarchy for how supplemental information is organized and presented in the spatial, multi-dimensional file for each of the axis points, wherein the rule set database includes a user interface that queries the user for different branches to be applied to an axis point and to be visible to a conference participant when viewing the VR file in a VR format; and
a virtual reality (VR) conversion engine in communication with the axis points database, the rule set database, and the supplemental information database, wherein the VR conversion engine is configured to create the VR file using (a) the at least one of the axis points from the axis points database, (b) the rule set for the at least one of the axis points, and (c) the supplemental information for the at least one axis of the axis points from the supplemental information database,
wherein the VR conversion engine further comprises a rendering component that accesses the rule set database to obtain one or more rule sets that comprise one or more rules, wherein each of the one or more rule sets is specific to one of the plurality of axis points; wherein the supplemental information is presented as branches of content and each of the branches of content is shown in three dimensions (3D) in a pathway format, wherein different supplemental information appears to be farther down a path than other of the supplemental information.

15. The system of claim 14, wherein there are a plurality of rule sets and a plurality of axis points, and each of the plurality of rule sets is associated with one of the plurality of axis points.

16. The system of claim 14, that further includes an electronic display configured to display the spatial, multi-dimensional file, and the system is further being configured to be in communication with a user device and to prompt the user device to select on the electronic display of (a) displaying the file in a two-dimensional format, or (2) displaying the spatial, multi-dimensional file.

17. The system of claim 14, wherein the file in a two-dimensional format includes topics and each of the topics is broken down into axis points that follow a hierarchical format.

18. The system of claim 14 that further includes a library of rendered landscapes in communication with the VR conversion engine, the system is configured so a user or the VR conversion engine can select the rendered landscape to use for the spatial, multi-dimensional file.

19. The system of claim 14 that is configured for a user to enter the hierarchy of information into the rule set database to help construct the rule set.

* * * * *